RAPID-SCAN INTERCEPT RECEIVER UTILIZING TRAVELING WAVE TUBES
Filed May 16, 1957
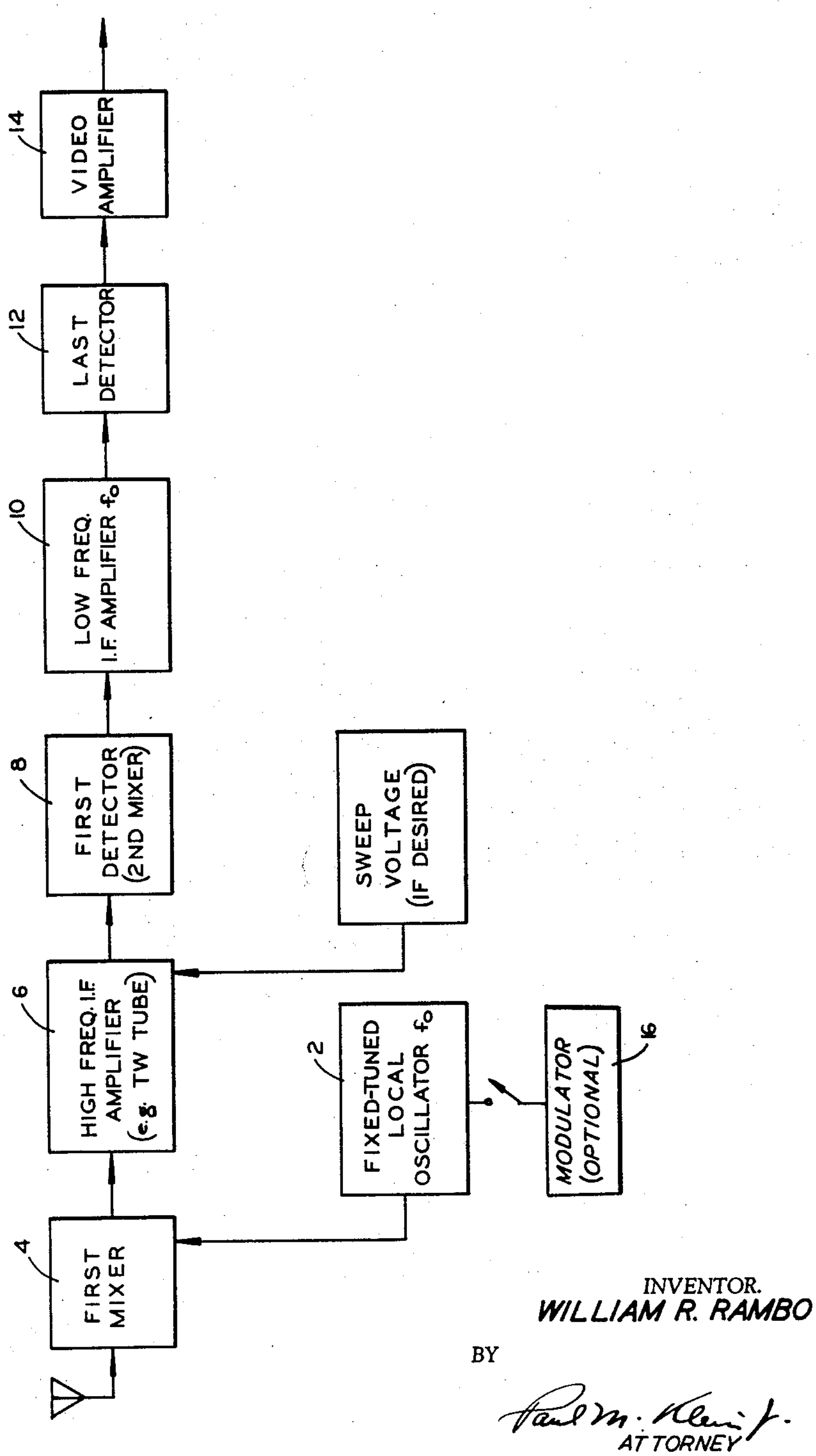
INVENTOR.
WILLIAM R. RAMBO
BY
Paul M. Klein Jr.
ATTORNEY United States Patent Office 3,189,827
Patented June 15, 1965

3,189,827

RAPID-SCAN INTERCEPT RECEIVER UTILIZING TRAVELING WAVE TUBES

William R. Rambo, San Jose, Calif., assignor, by mesne assignments, to the United States of America as represented by the Secretary of the Navy Filed May 16, 1957, Ser. No. 659,734
4 Claims. (Cl. 325—431)

This invention relates to methods and apparatus for receiving radio signals. As concerns the apparatus, it relates more particularly to an electronically tunable superheterodyne-type receiver.

Certain types of receivers of radio information, particularly traveling wave tube tunable R-F rapid-scan intercept receivers, suffer from disadvantages. Conventional prior art receivers of this category usually include low-level crystal-video detectors which are inherently low-sensitivity, noisy devices. They also, typically, require high-gain video amplifiers which offer severe practical problems to construct, particularly if logarithmic characteristics are desired.

An object of the present invention is to provide a receiver which will circumvent the problems of the conventional prior art receivers of this type.

Another object of the invention is to provide a method for receiving radio information particularly adapted for T-W tube tunable R-F rapid-scan intercept receivers.

Other objects and many of the attendant advantages of this invention will be readily appreciated as the same becomes better understood by reference to the following detailed description and from the single figure which represents a block diagram of one preferred embodiment of the apparatus of the invention.

Reference is now made to the drawing. As distinguished from the conventional superheterodyne-type receiver, the local oscillator 2 is a fix-tuned oscillator which will generate local oscillations at a frequency $f_0$ regardless of the frequency of the incoming R-F signal oscillations. In a typical embodiment the fix-tuned oscillator frequency is in the range of conventional I-F frequencies for rapid scan intercept receivers such as 30–60 mc. The first mixer 4 is a device for incorporating this local oscillator voltage into all incoming R-F signals. The mixing might be accomplished in a wide-band, specially designed mixer or it may be accomplished by a mixing process in the following T-W tube amplifier 6. The following T-W tube amplifier amplifies selected components of the mixed signals and does so on a frequency-selective basis if a voltage-tuned T-W tube amplifier is used. This T-W tube amplifier can thus be designated as a high frequency I-F stage. The second mixer (or first detector) 8 converts signals to what may be designated as the second I-F frequency which is the fixed local oscillator frequency. Further amplification, which is the majority in the system, takes place in the second or low-frequency I-F amplifier 10. This low-frequency I-F amplifier may be a conventional I-F amplifier which will pass $f_0$ and such superimposed modulation frequency components as would be expected on the original signal. The final detector 12 recovers the original signal modulation and feeds it to a video amplifier 14 in conventional fashion.

*Operation*

As adapted for scanning intercept receiver use, the invention operates in the following manner. The incoming R-F signal, $f_1$, is combined with oscillations at $f_0$ (say, 50 mc.) from the fix-tuned low-frequency local oscillator. The output of the first mixer then consists of 50 mc., the original R-F frequency, $f_1$, possibly harmonics and additional modulation products, plus the usual side bands displaced from the R-F frequency, $f_1$, by ±50 mc. The relative amounts of signal at each frequency will depend on input signal amplitudes, mixer and output circuit characteristics, and the degree of modulation achieved in the mixing process.

As in the prior art rapid-scan receivers, the high-frequency I-F T-W tube amplifier can operate in the dispersive region so that it serves as a tunable filter, the center frequency being electronically adjustable by a sweep voltage. The band width of the amplifier is sufficient to accommodate the original R-F frequency, $f_1$, and the side bands $f_1 \pm f_0$ but the local oscillator frequency, $f_0$ (and harmonics, etc.), as such, will be rejected. In other words, a set of "sum" and "difference" components is amplified along with the R-F signal, and the R-F band width and frequency resolution of the receiver are the equivalents of the prior art rapid-scan receivers.

The output of the T-W amplifier is fed to a first detector or second mixer where the signal-modulated local oscillator oscillations are recovered and fed to the second I-F amplifier centered at the local oscillator frequency. Considered as a detector, the unit is peaked at the local oscillator frequency, $f_0$, to favor those detected components. Considered as a mixer, the device can be regarded as re-combining the side bands with the carrier to produce a difference frequency output at the local oscillator frequency. In this sense, the R-F carrier serves as a high-frequency local oscillator signal. In any event, there is no output until an R-F signal is present to conduct the local oscillator frequency to the second I-F amplifier.

The principal amplification is done at the second I-F frequency and thereafter the output signal is detected at high level and fed to a conventional video amplifier.

In one sense, this is a double I-F system using one fixed high-frequency local oscillator and with the first I-F system tunable (rather than using a tunable local oscillator as in the ordinary superheterodyne circuit). The second local oscillator signal (which is the R-F carrier) is carried through the first I-F amplifier.

It is to be noted that the only direct coupling of the local oscillator to the second I-F strip at the local oscillator frequency is through the electron interaction in the T-W tube. The local oscillator, in practice, would have to be well shielded to keep down extraneous pickup in the second I-F amplifier. However, the circuit is directly adaptable to C-W interference rejection (at the local oscillator frequency) and simple circuits have been devised (in connection with radar applications) which will reduce a locally generated C-W interfering signal to satisfactory levels.

It is thus apparent that there has been provided an apparatus in which the majority of the system amplification can be accomplished at an I-F frequency (say, 50 mc.) rather than at video as in the conventional receivers. Side band widths are no problem and high stable gain is possible (and with a conveniently achieved logarithmic gain characteristic, if desired). The apparatus is particularly useful for detecting simultaneously pulses and C-W.

This scheme lends itself to the detection of an unmodulated signal (R-F) by modulating the fix-tuned local oscillator to produce modulation frequency components in the final video amplifier circuit, the presence of which gives indication of the existence of the unmodulated R-F carrier. One way of doing this would be to key or modulate the local oscillator signal periodically at a frequency falling within the video pass band. To provide for this feature, the optionally usable modulator 16 is shown in the drawing to be connected, if desired, as by a switch, to the local oscillator 2. Usually, if the apparatus is to be used with the expectation of receiving unmodulated R-F signal, the switch would be closed, and if it is used with the expectation of receiving modulated R-F signals then the switch would be left open, but it is possible to receive both types of signal with the switch closed. In this latter instance, however, any modulated R-F signal received would be more or less distorted by the modulation imposed upon the local oscillator, depending on the relative frequency and amplitude of the local modulator oscillation compared to that of the incoming R-F signal.

*Method of the invention*

The aforedescribed apparatus is only one of numerous embodiments which can be used to carry out the method of the invention. The method of the invention for radio signal reception comprises receiving signal oscillations at an incoming R-F frequency of, say, $f_1$; generating local oscillations at a fixed local oscillator frequency of, say, $f_0$; causing the incoming R-F signal and the local oscillator signal to interact to produce a complex wave form containing frequency components at the original R-F carrier frequency $f_1$ and sum and difference side bands plus additional frequencies immediately adjacent thereto as determined by modulation present in the original R-F signal or imposed on the local oscillator oscillations $f_0$; amplifying this complex wave form; thereafter causing the components of the wave form to interact with one another to produce signal-modulated oscillations at the local oscillator frequency $f_0$; and finally amplifying and detecting these signal-modulated oscillations of the local oscillator frequency.

Obviously many modifications and variations of the present invention are possible in the light of the above teachings. It is therefore to be understood that within the scope of the appended claims the invention may be practiced otherwise than as specifically described.

What is claimed is:

1. A radio receiver comprising means for receiving R-F microwave signal oscillations; a fix-tuned local oscillator; a first mixer for combining said signal oscillations with the local oscillator oscillations; a high frequency I-F amplifier for amplifying the output of said first mixer constituting signals at the incoming signal frequency, at a frequency equal to sum of the incoming signal frequency and the local oscillator frequency, and at a frequency equal to the difference between the incoming signal frequency and the local oscillator frequency; said high frequency I-F amplifier excluding from its pass band the local oscillator frequency; a second mixer for converting the output of said high frequency I-F amplifier into modulated oscillations at the local oscillator frequency; a low frequency I-F amplifier for amplifying the output of said second mixer; and detector means for detecting the output of said low frequency I-F amplifier.

2. The apparatus of claim 1 further including video amplifier means as may be desirable for further amplifying the output of said detector.

3. The apparatus of claim 1 where said high frequency I-F amplifier includes a scanned traveling wave tube.

4. The method of radio signal reception which comprises receiving R-F signal oscillations at a frequency $f_1$; generating local oscillations at a fixed frequency $f_0$, said frequency remaining fixed at $f_0$ regardless of changes in the frequency $f_1$ of said received R-F signals; at least one of said oscillations being subjected to modulation; causing said two oscillations to interact to produce a complex wave form containing frequency components at frequencies $f_1$, $f_1+f_0$, $f_1-f_0$, and the frequencies immediately adjacent thereto as determined by said modulation; amplifying said complex wave forms; causing the frequency components in said amplified wave form to interact with one another to produce modulated oscillations at frequency $f_0$; and thereafter amplifying and detecting said last-named oscillations.

References Cited by the Examiner

UNITED STATES PATENTS

| | | | |
|---|---|---|---|
| 1,737,407 | 11/29 | Bruce | 325—461 |
| 2,039,923 | 5/36 | O'Brien | 325—439 |
| 2,041,846 | 5/36 | Mathes | 325—419 |
| 2,091,546 | 8/37 | Hruska | 325—443 |
| 2,211,352 | 8/40 | Simpson | 325—434 |
| 2,558,790 | 7/51 | Smith | 325—421 |
| 2,621,289 | 12/52 | Gray | 325—430 |
| 2,939,918 | 6/60 | Freedman et al. | 325—427 X |

FOREIGN PATENTS

| | | |
|---|---|---|
| 414,769 | 8/34 | Great Britain. |

DAVID G. REDINBAUGH, *Primary Examiner.*

FREDERICK M. STRADER, CHESTER L. JUSTUS, *Examiners.*